United States Patent

Kelm et al.

(10) Patent No.: US 6,715,995 B2
(45) Date of Patent: Apr. 6, 2004

(54) HYBRID COMPRESSOR CONTROL METHOD

(75) Inventors: Brian Robert Kelm, Plymouth, MI (US); Robert John Mohrmann, Pinckney, MI (US); Richard Eric Luken, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 123 days.

(21) Appl. No.: 10/062,317

(22) Filed: Jan. 31, 2002

(65) Prior Publication Data

US 2003/0143087 A1 Jul. 31, 2003

(51) Int. Cl.$^7$ .............................. F04B 49/00; F04B 9/14
(52) U.S. Cl. .............................. 417/12; 417/16; 417/53; 417/218; 417/374; 62/229
(58) Field of Search .............................. 417/12, 15, 16, 417/53, 223, 374, 218; 62/229

(56) References Cited

U.S. PATENT DOCUMENTS

| 4,480,443 A | * 11/1984 | Nishi et al. ............... 62/227 |
| 4,490,987 A | 1/1985 | Peterson |
| 4,582,124 A | 4/1986 | Yoshimi et al. |
| 4,640,183 A | 2/1987 | Doi |
| 4,766,950 A | 8/1988 | Yamada et al. |
| 4,815,300 A | 3/1989 | Suzuki |
| 4,860,549 A | 8/1989 | Murayama |
| 4,864,832 A | 9/1989 | Suzuki |
| 4,946,350 A | 8/1990 | Suzuki et al. |
| 5,025,636 A | 6/1991 | Terauchi |
| 5,172,563 A | 12/1992 | Fujii |
| 5,564,493 A | 10/1996 | Kato et al. |
| 5,584,670 A | 12/1996 | Kawaguchi et al. |
| 5,653,119 A | 8/1997 | Kimura et al. |
| 5,689,960 A | 11/1997 | Bearint |
| 5,755,282 A | 5/1998 | Teshima et al. |
| 5,775,415 A | 7/1998 | Yoshimi et al. |
| 5,865,604 A | 2/1999 | Kawaguchi et al. |

(List continued on next page.)

FOREIGN PATENT DOCUMENTS

| EP | 1 033 489 A2 | 9/2000 |
| EP | 1 033 490 A2 | 9/2000 |
| EP | 1 059 443 A2 | 12/2000 |
| JP | 8-165988 | 6/1996 |
| JP | 8-296552 | 11/1996 |
| JP | 10-54350 | 2/1998 |

OTHER PUBLICATIONS

Derwent Abstract of Japanese Paten 10–54350.
Derwent Abstract of Japanese Patent 8–165988.
English Translation of Japanese Patent 8–296552.

Primary Examiner—Charles G. Freay
(74) Attorney, Agent, or Firm—Brinks Hofer Gilson & Lione

(57) ABSTRACT

A method for controlling a hybrid compressor system is disclosed. The hybrid compressor system includes a variable displacement hybrid compressor that is selectively driven by one of an engine and an electric motor to cool a passenger compartment of a vehicle. The method includes the steps of transmitting a demand signal to activate an electric motor drive mode of the hybrid compressor system, whereby the electric motor drives the hybrid compressor, transmitting a compressor displacement signal to the hybrid compressor to set a displacement of the compressor to a minimum level, waiting a predefined time period, activating the electric motor to drive the compressor, determining a suction pressure of a suction chamber of the hybrid compressor, determining whether the displacement of the hybrid compressor is sufficient based on the suction pressure determination, and changing the displacement of the compressor if the displacement is insufficient.

20 Claims, 5 Drawing Sheets

U.S. PATENT DOCUMENTS

| | | |
|---|---|---|
| 5,884,497 A | 3/1999 | Kishita et al. |
| 5,924,296 A | 7/1999 | Takano et al. |
| 6,056,513 A | 5/2000 | Kawaguchi et al. |
| 6,105,380 A | 8/2000 | Yokomachi et al. |
| 6,134,895 A | 10/2000 | Poloskey et al. |
| 6,138,468 A | 10/2000 | Yokomachi et al. |
| 6,164,925 A | 12/2000 | Yokomachi et al. |
| 6,192,699 B1 | 2/2001 | Kato et al. |
| 6,212,893 B1 | 4/2001 | Ban et al. |
| 6,217,291 B1 | 4/2001 | Ota et al. |
| 6,224,348 B1 | 5/2001 | Fukanuma et al. |
| 6,230,507 B1 | 5/2001 | Ban et al. |
| 6,233,957 B1 | 5/2001 | Hirao et al. |
| 6,234,763 B1 | 5/2001 | Ota et al. |
| 6,244,159 B1 | 6/2001 | Kimura et al. |
| 6,247,899 B1 * | 6/2001 | Ban et al. .................. 417/16 |
| 6,263,687 B1 | 7/2001 | Ban et al. |
| 6,267,563 B1 | 7/2001 | Yamada et al. |
| 6,287,081 B1 * | 9/2001 | Tamegai et al. ............. 417/15 |

* cited by examiner

HYBRID COMPRESSOR CONTROL METHOD

TECHNICAL FIELD

The present invention relates to methods for controlling a hybrid compressor system having a refrigerant compressor that is selectively driven by an engine or an electric motor, and to methods that optimize the electric motor's operation and efficiency.

BACKGROUND

Conventional automotive air conditioning systems generally include a refrigeration circuit having a refrigerant compressor. Typically, the compressor is driven by the engine via a drive belt. As the compressor is driven by the engine, the refrigerant circulates in the refrigeration circuit absorbing heat from the passenger compartment thereby providing a cooling effect. The compressor is typically coupled to the vehicle's engine via an electromagnetic clutch. Thus, when the cooling capacity of the refrigerant circuit outweighs the thermal load on the circuit, the electromagnetic clutch disengages the engine thereby halting the operation of the compressor. Furthermore, conventional automotive air conditioning systems do not operate when the engine is off, thus the passenger compartment may not be cooled when the engine is off.

However, an automotive hybrid air conditioning system known in the art to include a "hybrid compressor" are selectively driven by an engine or an electric motor. These hybrid air conditioning systems may be driven by the engine while the engine is running and by the electric motor when the engine is not running to effect cooling on the passenger compartment. Typically, a hybrid compressor is a refrigerant compressor having a driveshaft, wherein an electric motor is coupled to the driveshaft and an electromagnetic clutch is connected to an output shaft of the output motor. Typically the engine is connected to the output shaft through the clutch. When the clutch is turned on, engine power is transmitted to the driveshaft through the output shaft, which operates the compressor. The output shaft of the motor rotates with the driveshaft of the compressor. The rotation of the output shaft generates electromotive force in the motor. This electromotive force may be used to charge the battery. However, when the engine is turned off, the clutch is turned off and the output shaft and driveshaft are disconnected from the engine. The motor may now drive the compressor by deriving power from the battery.

It would be desirable to provide a control method for controlling hybrid compressors that would minimize motor stall torque and allow for a gradual ramping up of the speed of the electric motor. The control method should eliminate a large in rush current during motor start up as well as optimize motor speed and efficiency.

DETAILED DESCRIPTION

Figure 1:
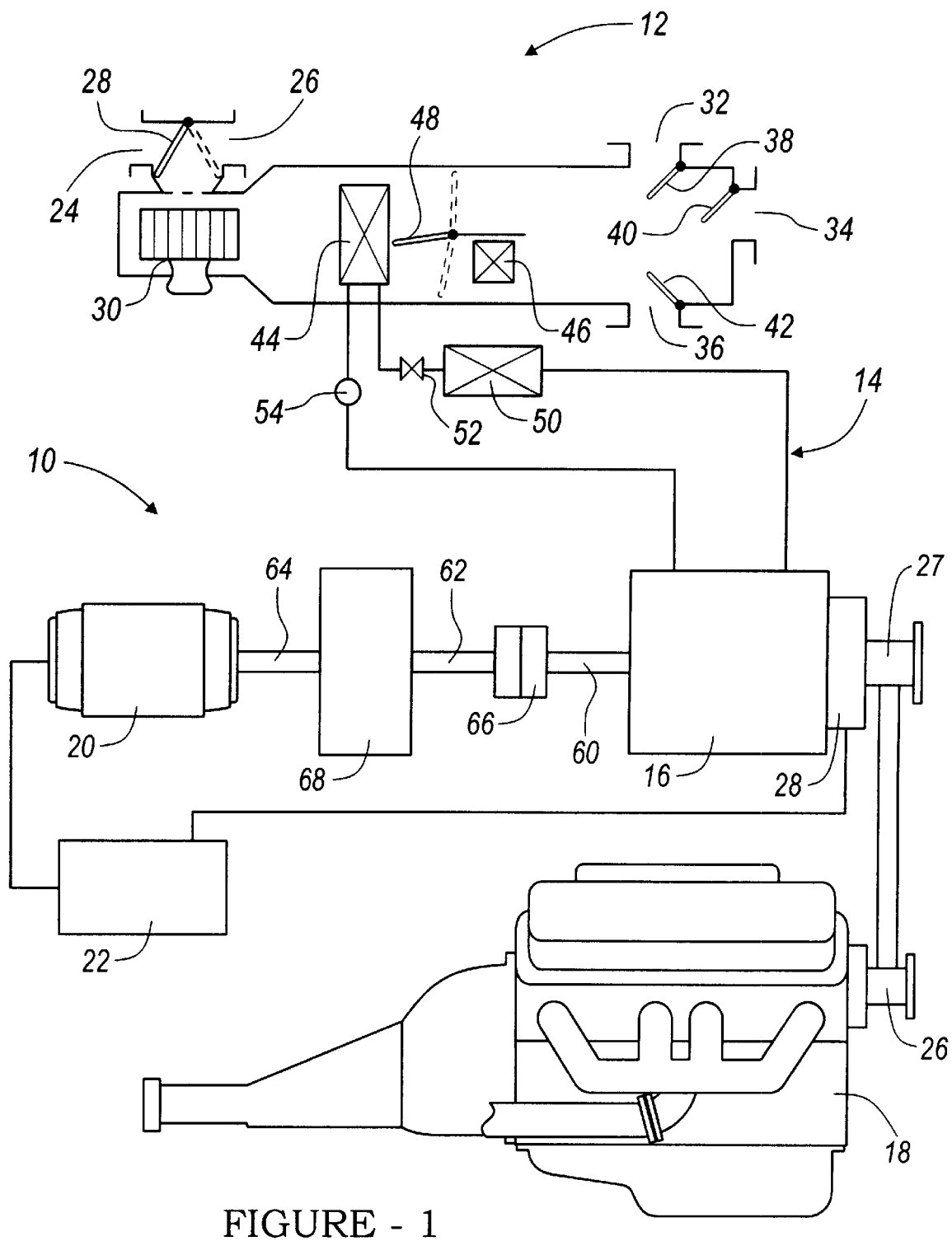
FIG. 1 is a schematic diagram of an air conditioning system for an automobile having a hybrid compressor, in accordance with the present invention.

Referring now to FIG. 1, an automotive hybrid air conditioning system 10 is schematically illustrated, in accordance with the present invention. Air conditioning system 10 includes an air conditioning duct 12 in communication with a vehicle passenger compartment (not shown), a refrigeration circuit 14, a refrigerant compressor 16 in fluid communication with circuit 14, an engine 18 coupled to compressor 16, an electric motor 20 also coupled to compressor 16 and a controller 22 for controlling system 10. Air conditioning duct 12 includes a fresh air intake vent 24 for allowing air external of the vehicle to enter the passenger compartment and an internal air recirculation vent 26 for recirculating air within the passenger compartment. An intake air door 28 is further provided to open and close vents 24 and 26 accordingly. A blower fan and motor assembly 30 is further provided to draw air into a duct 12 as well as push air through duct 12. A plurality of passenger compartment vents 32, 34, 36 direct conditioned air into various parts of the passenger compartment. Accordingly, mode doors 38, 40, and 42 open and close the passenger compartment vents, respectively.

As air is drawn into duct 12 through vents 24 or 26, the air is conditioned by an evaporator 44, which acts as a heat exchanger to effectuate cooling of the air passing through the duct 12. A heater core 46 is further provided to effectuate heating of the air circulating through duct 12 when a heater core 48 allows intake air to pass through heater core 46.

The refrigerant circuit 14 of air conditioning system 10 further includes a condenser or a radiator 50, an expansion valve 52 and an accumulator 54. In operation, the refrigerant circuit 14 in communication with compressor 16 compresses a coolant. The compressed coolant is then cooled by condenser 50. A The cooled coolant then undergoes adiabatic expansion through the expansion valve 52 and then the coolant evaporates in evaporator 44 providing the desired cooling effect of the passenger compartment. Accumulator 54 provides gas/liquid separation of the coolant and adjusts the quality of the coolant.

The control unit 22 controls the operation of the aforementioned automotive air conditioning system. Various sensors and switches (not shown) are in communication with control unit 22 to provide information regarding heat loading on the passenger compartment, as well as desired cooling level indicated by a vehicle occupant. Further, control unit 22 includes control logic, which may be implemented through hardware or software or a combination thereof.

In an embodiment of the present invention, executable code is stored in memory of control unit 22. Such memory may include for example, random access memory, read only memory, and/or non-volatile memory. The specifics of the executable code for controlling the operation of air conditioning system 10 will be described in subsequent paragraphs. Control unit 22 at appropriate conditions will output control signals to operate various actuators and drives to control the operation of motors such as the fan motor, vent doors and intake doors as needed. Further, control unit 22 controls the operation of an electromagnetic clutch, which engages and disengages the compressor 16 from engine 18.

Compressor 16 is preferably a hybrid compressor having two drive sources, for example engine 18 and electric motor 20. Electromagnetic clutch 28 is further provided to engage and disengage compressor 16 from engine 18, for example when engine 18 is not running or when there is no cooling demand. Further, compressor 16 is interconnected through driveshafts 60, 62, and 64 to electric motor 20.

In an embodiment of the present invention, a second electromagnetic clutch 66 is provided to disengage electric motor 20 from compressor 16 when engine 18 is driving the compressor. Thus, the present invention operates more efficiently than prior art methods and systems by disengaging the motor, thereby reducing the load on the engine. Further, a gear box 68 may be provided to change the rotational speed of the transmission shafts 62 and 64. In this way, the present invention allows a variety of electric motors having different rotational speed and torque specifications to be utilized.

Figure 2:
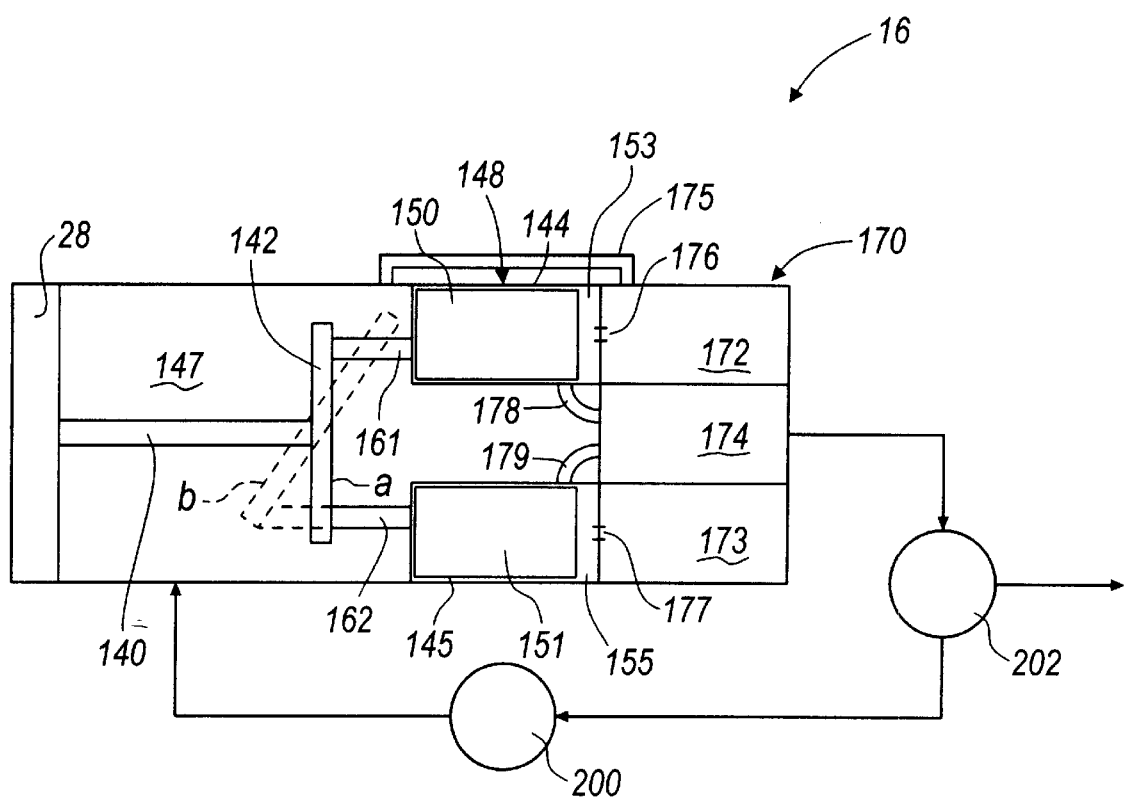
FIG. 2 is a schematic diagram of a variable displacement compressor that is selectively driven by the engine or the electric motor, in accordance with the present invention.

Referring now to FIG. 2, a schematic diagram of variable displacement compressor 16 is shown in greater detail, in accordance with the present invention. Compressor 16 includes a driveshaft 140 that is operatively coupled to an external drive source such as vehicle engine 18 by electromagnetic clutch 28 and to electric motor 20. A swashplate 142 is rotatably secured to shaft 140 and is pivotable about the driveshaft. A pair of guide arms 161 and 162 are attached to swashplate 142 at a first end and to pistons 150 and 151 at a second end. The engagement between guide arms 161, 162 and the associated pistons guides the inclination of the swashplate 142 and rotates the swashplate with respect to the driveshaft 140. Driveshaft 140 and swashplate 142 are positioned within a crankcase chamber 147. The pressure in crankcase chamber 147 controls the angle of inclination of the swashplate.

Generally, compressor 16 further includes a cylinder housing 148 having cylindrical bores 144 and 145 extending therethrough. Each bore 144 and 145 accommodates one piston 150, 151. Each piston and bore define compression chambers 153, 155. Alternatively, each piston may be coupled to the swashplate by a pair of shoes (not shown). Rotation of the swashplate is converted into reciprocation of pistons 150, 151 in bores 144, 145 by means of the shoes, as well known in the art.

Further, compressor 16 includes a rear housing 170 having a suction chamber 172 and 173 and a discharge chamber 174. Suction ports 176 and 177 and discharge ports 178 and 179 are also provided at each chamber. A suction valve (not shown) is provided at each suction port for opening and closing the suction port. A discharge valve (not shown) is provided at each discharge port for opening and closing the discharge port. Further, a bypass port or orifice 175 is provided between crankcase chamber 147 and suction chamber 172.

As each piston 150, 151 moves from a fully extended position to a fully retracted position refrigerant is drawn into the corresponding suction port from the suction chamber to enter the associated compression chamber. Conversely, when each piston moves from a fully retracted position to a fully extended position, the refrigerant is compressed in compression chambers 153, 155 and the discharge valve opens allowing refrigerant to flow into discharge chamber 174 through associated discharge ports 178, 179. The inclination of swashplate 148 varies in accordance with the difference between the pressure in crankcase chamber 147 and the pressure in compression chambers 153, 155. More specifically, the difference between the pressure in crankcase chamber 147 (PC) and the pressure in the suction chambers 172, 173 (PS) or the pressure difference "PC–PS" determines the inclination of the swashplate. PC is maintained at a pressure value that is higher than the suction pressure PS (PC>PS). An increase in the pressure difference PC–PS decreases the inclination of the swashplate. This shortens the stroke of each piston 150,151 and decreases the displacement of compressor 16. On the other hand, a decrease in pressure difference PC–PS increases the inclination of swashplate 142. This lengthens the stroke of each piston 150,151 and increases the displacement of compressor 16.

In FIG. 2 swashplate 142 is indicated by solid-lines (a) in a first position (position a). When the swashplate is in position (a) the pistons 150, 151 do not reciprocate within chambers 153, 155. Compressor 16 is at its minimum displacement. As indicated by dashed-lines (b) the swashplate may be disposed in a second position (position b). Position (b) illustrates the maximum angle of inclination the swashplate can achieve. This is also the position in which compressor 16 achieves its maximum displacement. Depending on the pressures in crankcase chamber 147, suction chamber 172 and discharge chamber 174 the swashplate may be inclined at any angle between position (a) and (b) achieving variable displacement.

An electronic control valve 200 is in communication with the discharge chamber 174, through a refrigerant/oil separator 202, and with the crankcase chamber. Electronic control valve 200 regulates the pressure in crankcase chamber 147, suction chamber 172 and discharge chamber 174, by selectively opening and closing communication ports connecting the crankcase chamber to the discharge chamber. A control strategy for actuating valve 200 will be described hereinafter.

In a preferred embodiment of the present invention, a control strategy for controlling the operation of compressor 16 and electromagnetic control valve 200 is implemented in software, or in hardware or in both software and hardware. For example, control logic for controlling the operation of control valves 200 in one embodiment, is stored in the read only memory of the controller 22.

Figure 3A:
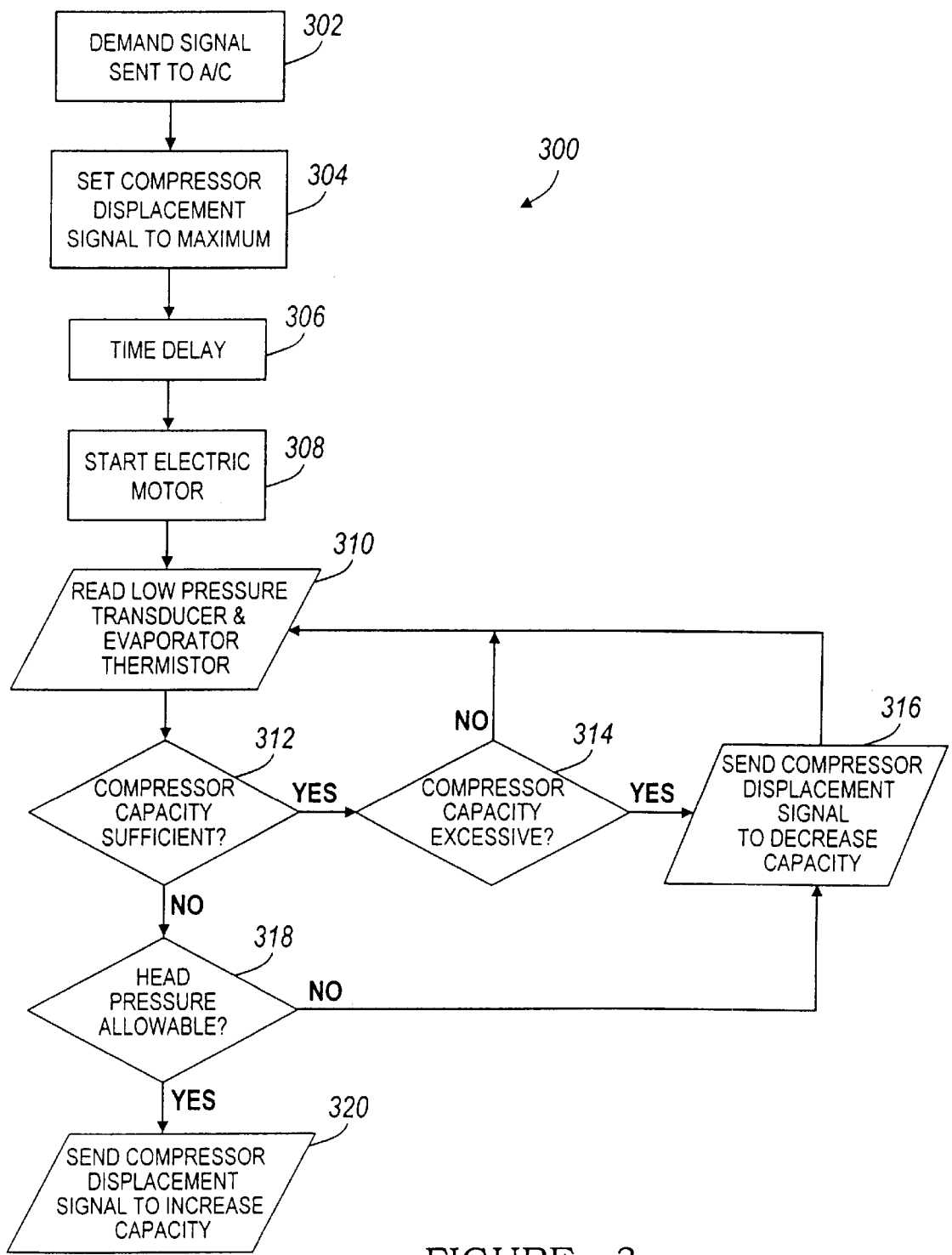
FIG. 3a is a flow chart illustrating a method for controlling the hybrid compressor, in accordance with the present invention.

Referring now to FIG. 3a, a variable displacement compressor and control valve strategy or method 300 is illustrated, in accordance with the present invention. Method 300 is activated when engine 18 is not operating or not driving compressor 16. Advantageously, method 300 improves the efficiency of electric motor 20 and provides optimal operation of system 10.

Method 300 is initiated at block 302 when controller 22 receives an A/C demand signal indicating that air conditioning of the passenger compartment is desired. Since the engine is not operating, controller 22 initiates an electric motor A/C mode, wherein the electric motor becomes the power source to drive compressor 16. At block 304, the controller sends a compressor displacement signal to control valve 200 to reduce the capacity of the variable displacement compressor 16 to a minimum displacement. The compressor displacement signal is set to a maximum level. At block 306, the controller waits a programmable amount of time before it starts electric motor 20, this allows for movement of swashplate 142. Electric motor 20 is then energized by controller 22, as represented by block 308.

At block 310, the suction pressure of suction chamber 172 is determined from reading a low-pressure transducer, in communication with suction chamber 172, and an evaporator thermister. The capacity or displacement sufficiency of compressor 16 is checked at block 312 by evaluating the suction pressure. If the capacity of compressor 16 is sufficient, then at block 314 method 300 determines whether there is excess capacity. If there is not excess capacity then the method returns to block 310 where the suction pressure is again monitored. However, if the controller determines that there is excess capacity in compressor 16 after evaluating the suction pressure, then the compressor displacement signal is increased to decrease the capacity of compressor 16, as represented by block 316.

If however, at block 312 the capacity of the compressor 16 is determined to be insufficient then the head pressure is checked at block 318. The head pressure is determined based on input from the high-pressure transducer to ensure that the head pressure is within a specified range. If the head pressure is not within the specified range, then the compressor displacement signal to actuate control valve 200 is increased to decrease the capacity of compressor 16, as represented by block 316. However, if at block 318 the head pressure is determined to be within the allowable range after the high pressure transducer is read, the compressor displacement signal is decreased to increase the capacity of compressor 16, as represented by block 320.

Figure 3B:
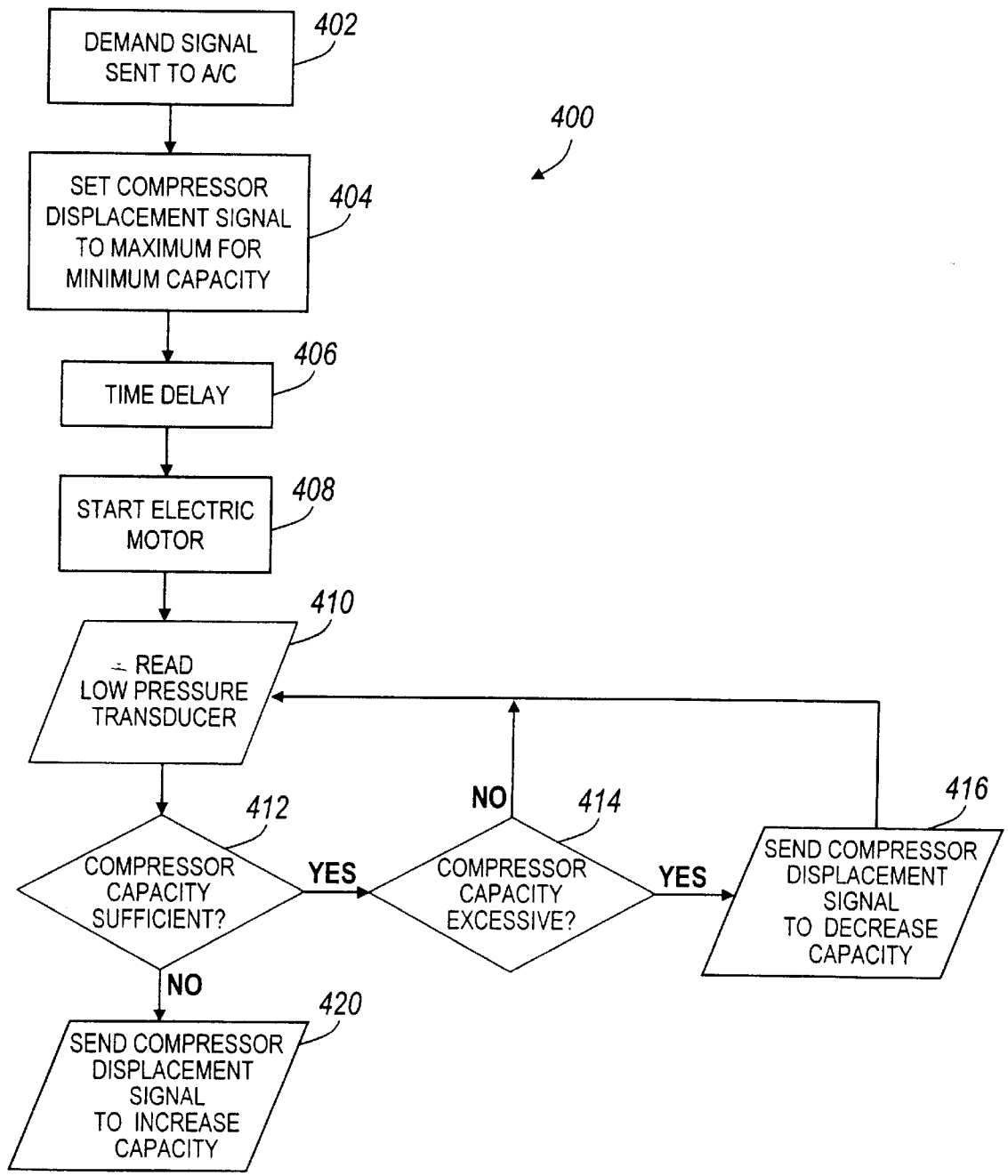
FIG. 3b is a flow chart illustrating an alternative method for controlling the hybrid compressor, in accordance with the present invention.

In an alternative embodiment of the present invention, an alternative method 400 for controlling variable displacement compressor 16 and control valve 200 when engine 18 is not driving compressor 16 is illustrated in flowchart form in FIG. 3*b*. Method 400 is initiated at block 402 when controller 22 receives an A/C demand signal. The A/C demand signal indicates that the air conditioning of the passenger compartment is desired. Since the engine is not operating, controller 22 initiates an electric A/C mode wherein the electric motor becomes the power source to drive compressor 16. At block 404, the controller sends a compressor displacement signal to control valve 200 to reduce the capacity of the variable displacement compressor 16 to a minimum displacement. The compressor displacement signal is set to a maximum. At block 406, the controller waits a programmable amount of time before it starts electric motor 20 to allow for movement of the swashplate 142. Electric motor 20 is energized after a voltage is switched by controller 22, as represented by block 408. At block 410, the low pressure transducer is read. The capacity sufficiency of compressor 16 is checked at block 412. If the capacity of compressor 16 is sufficient, then at block 414 the method determines whether there is excess capacity in compressor 16. If there is not excess capacity then the method returns to block 410 where the low pressure transducer is monitored. However, if the controller determines that there is excess capacity in compressor 16 after evaluating the low pressure transducer, then the compressor displacement signal is increased to decrease the capacity of compressor 16, as represented by block 416.

If however, at block 412 the capacity of the compressor 16 is determined to be insufficient, after reading the low pressure transducer, the compressor displacement control signal is sent to the control valve to increase the capacity of compressor 16, as represented by block 420.

Figure 3C:
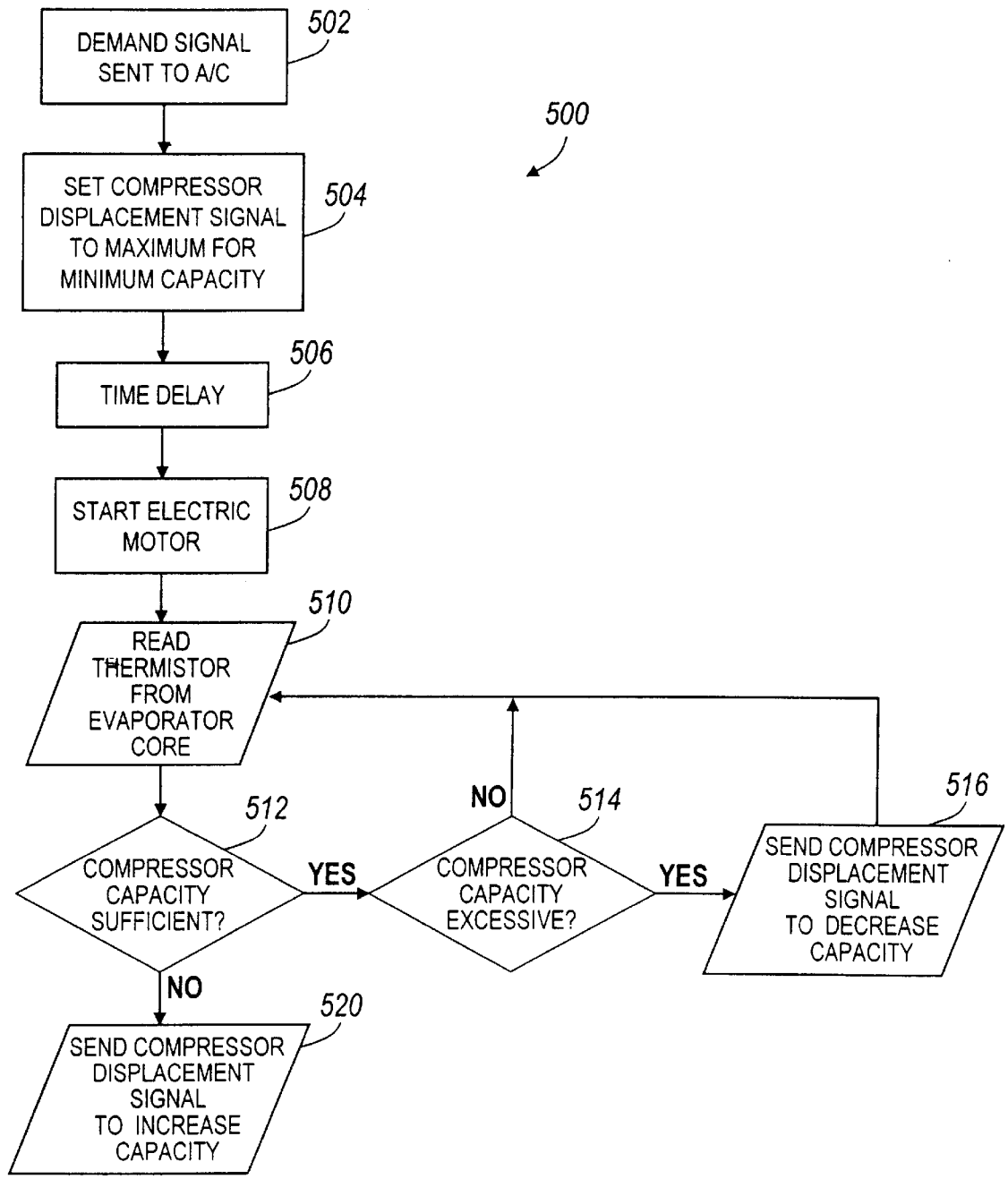
FIG. 3c is a flow chart illustrating another alternative method for controlling the hybrid compressor, in accordance with the present invention.

In still another alternative embodiment of the present invention, an alternative method 500 for controlling variable displacement compressor 16 and control valve 200 when engine 18 is not driving compressor 16 is illustrated in flowchart form in FIG. 3*c*. Method 500 is initiated at block 502 when controller 22 receives an A/C demand signal. The A/C demand signal indicates that the air conditioning of the passenger compartment is desired. Since the engine is not operating, controller 22 initiates an electric A/C mode wherein the electric motor becomes the power source to drive compressor 16. At block 504, the controller sends a compressor displacement signal to control valve 200 to reduce the capacity of the variable displacement compressor 16 to a minimum displacement. The compressor displacement signal is set to a maximum. At block 506, the controller waits a programmable amount of time before it starts electric motor 20 to allow for movement of swashplate 142. Electric motor 20 is energized after a voltage is switched by controller 22, as represented by block 508. At block 510, the evaporator core thermister is read. The capacity sufficiency of compressor 16 is checked at block 512. If the capacity of compressor 16 is sufficient, then at block 514 the method determines whether there is excess capacity in compressor 16. If there is not excess capacity then the method returns to block 510 where the evaporator temperature is monitored. However, if the controller determines that there is excess capacity in compressor 16 after evaluating the evaporator core temperature, then the compressor displacement signal is increased to decrease the capacity of compressor 16, as represented by block 516.

If however, at block 512 the capacity of the compressor 16 is determined to be insufficient, after reading the evaporator core temperature using the evaporator thermister, the compressor displacement control signal is sent to the control valve to increase the capacity of compressor 16, as represented by block 520.

As any person skilled in the art of hybrid compressors will recognize from the previous detailed description and from the figures and claims, modifications and changes can be made to the preferred embodiments of the invention without departing from the scope of this invention defined in the following claims.

We claim:

1. A method for controlling a hybrid compressor system, wherein the hybrid compressor system has a variable displacement hybrid compressor that is selectively driven by one of an engine and an electric motor to cool a passenger compartment of a vehicle, the method comprising:
    transmitting a demand signal to activate an electric motor drive mode of the hybrid compressor system, whereby the electric motor drives the hybrid compressor;
    transmitting a compressor displacement signal to the hybrid compressor to set a displacement of the compressor to a minimum level;
    waiting a predefined time period;
    activating the electric motor to drive the compressor;
    determining a suction pressure of a suction chamber of the hybrid compressor;
    determining whether the displacement of the hybrid compressor is sufficient based on the suction pressure determination; and
    changing the displacement of the compressor if the displacement is insufficient.

2. The method of claim 1 further comprising determining whether a head pressure is within an allowable range.

3. The method of claim 1 further comprising reading a low pressure transducer to determine the sufficiency of the displacement.

4. The method of claim 3 further comprising reading an evaporator core thermister to determine the sufficiency of the displacement.

5. The method of claim 1 further comprising transmitting a compressor displacement signal to decrease the displacement of the compressor when the displacement is excessive.

6. The method of claim 1 further comprising transmitting a compressor displacement signal to increase the displacement of the compressor when the displacement is insufficient.

7. A method for controlling a hybrid compressor system, wherein the hybrid compressor system has a variable displacement hybrid compressor that is selectively driven by one of an engine and an electric motor to cool a passenger compartment of a vehicle, the method comprising:

transmitting a demand signal to activate an electric motor drive mode of the hybrid compressor system, whereby the electric motor drives the hybrid compressor;

transmitting a compressor displacement signal to the hybrid compressor to set a displacement of the compressor to a minimum level;

waiting a predefined time period;

activating the electric motor to drive the compressor;

reading a low pressure transducer;

determining whether the displacement of the hybrid compressor is sufficient based on the low pressure transducer reading; and changing the displacement of the compressor if the displacement is insufficient.

8. The method of claim 7 further comprising determining whether a head pressure is within an allowable range.

9. The method of claim 7 further comprising reading an evaporator core thermister to determine the sufficiency of the displacement.

10. The method of claim 7 further comprising transmitting a compressor displacement signal to decrease the displacement of the compressor when the displacement is excessive.

11. The method of claim 7 further comprising transmitting a compressor displacement signal to increase the displacement of the compressor when the displacement is insufficient.

12. A method for controlling a hybrid compressor system, wherein the hybrid compressor system has a variable displacement hybrid compressor that is selectively driven by one of an engine and an electric motor to cool a passenger compartment of a vehicle, the method comprising:

transmitting a demand signal to activate an electric motor drive mode of the hybrid compressor system, whereby the electric motor drives the hybrid compressor;

transmitting a compressor displacement signal to the hybrid compressor to set a displacement of the compressor to a minimum level;

waiting a predefined time period;

activating the electric motor to drive the compressor;

reading an evaporator core thermister;

determining whether the displacement of the hybrid compressor is sufficient based on the evaporator core thermister reading; and changing the displacement of the compressor if the displacement is insufficient.

13. The method of claim 12 further comprising determining whether a head pressure is within an allowable range.

14. The method of claim 12 further comprising reading a low pressure sensor to determine the sufficiency of the displacement of the compressor.

15. The method of claim 12 further comprising transmitting a compressor displacement signal to decrease the displacement of the compressor when the displacement is excessive.

16. The method of claim 12 further comprising transmitting a compressor displacement signal to increase the displacement of the compressor when the displacement is insufficient.

17. A method for controlling a hybrid compressor system, wherein the hybrid compressor system has a variable displacement hybrid compressor that is selectively driven by one of an engine and an electric motor to cool a passenger compartment of a vehicle, the method comprising:

transmitting a demand signal to activate an electric motor drive mode of the hybrid compressor system, whereby the electric motor drives the hybrid compressor;

transmitting a compressor displacement signal to the hybrid compressor to set a displacement of the compressor to a minimum level;

waiting a predefined time period;

activating the electric motor to drive the compressor;

reading an evaporator core thermister;

reading a low pressure transducer;

determining whether the displacement of the hybrid compressor is sufficient based on the evaporator core thermister reading and the low pressure transducer reading; and changing the displacement of the compressor if the displacement is insufficient.

18. The method of claim 17 further comprising determining whether a head pressure is within an allowable range.

19. The method of claim 17 further comprising transmitting a compressor displacement signal to decrease the displacement of the compressor when the displacement is excessive.

20. The method of claim 17 further comprising transmitting a compressor displacement signal to increase the displacement of the compressor when the displacement is insufficient.

* * * * *